United States Patent [19]

Javery et al.

[11] Patent Number: 5,581,058
[45] Date of Patent: Dec. 3, 1996

[54] MULTIFUNCTION SWITCH STALK FOR CONTROLLING VEHICLE FUNCTIONS

[75] Inventors: Robert P. Javery, Southfield; Daniel T. Lau, Canton, both of Mich.

[73] Assignee: United Technologies Automotive, Inc., Dearborn, Mich.

[21] Appl. No.: 382,911

[22] Filed: Feb. 3, 1995

[51] Int. Cl.⁶ .................................................. H01H 9/00
[52] U.S. Cl. .................. 200/4; 200/61.27; 200/61.54; 200/11 G
[58] Field of Search ................ 200/4, 5 R, 11 R, 200/11 G, 11 J, 11 K, 61.27–61.38, 61.54–61.57; 307/10.1; 74/484 R

[56] References Cited

U.S. PATENT DOCUMENTS

| | | | |
|---|---|---|---|
| 3,499,125 | 3/1970 | Stoi | 200/61.54 X |
| 3,511,943 | 5/1970 | Kibler | 200/4 |
| 4,219,709 | 8/1980 | Scarbro | 200/61.54 |
| 4,321,437 | 3/1982 | Cryer | 200/61.54 |
| 4,387,279 | 6/1983 | Brevick | 200/61.54 |
| 4,723,057 | 2/1988 | Lane, Jr. | 200/61.27 |
| 4,849,585 | 7/1989 | Vidican et al. | 200/61.54 |
| 4,930,366 | 6/1990 | Boucher et al. | 200/61.54 X |
| 5,003,132 | 3/1991 | Lagier | 200/4 |
| 5,107,243 | 4/1992 | Maeda | 200/61.54 X |
| 5,406,040 | 4/1995 | Johnson | 200/6 A |
| 5,430,265 | 7/1995 | Beattie et al. | 200/61.54 |

FOREIGN PATENT DOCUMENTS

0160905  11/1985  European Pat. Off. ......... G05G 1/00

*Primary Examiner*—J. R. Scott
*Attorney, Agent, or Firm*—Howard & Howard

[57] ABSTRACT

A multifunctional switch stalk includes controls for both the front and rear wash and wiper functions. The multifunction switch stalk includes a handle having a shaft extending to an outer end of the handle. A rear control ring is rotatable on the shaft to actuate the rear wiper functions. The rear control ring may also actuate a rear window wash in either of two extreme rotational positions. A spring return returns the rear control ring from each rear window wash position upon release of the control ring by the operator. A control knob is mounted on an outer end of the shaft and is rotatable to selectively actuate the front windshield wiper functions. An axially compressible wash push button is mounted on the outer end of the control knob to selectively actuate a front windshield wash function.

17 Claims, 5 Drawing Sheets

MULTIFUNCTION SWITCH STALK FOR CONTROLLING VEHICLE FUNCTIONS

BACKGROUND OF THE INVENTION

This invention relates to a multifunction switch stalk which can be mounted on a vehicle steering column.

Modern motor vehicles often include a switch stalk mounted on the vehicle steering column which controls turn signals, headlights or windshield wipers. One currently-used switch stalk includes a control knob on the outer end of the switch stalk. The control knob is rotated to selectively actuate vehicle functions such as windshield wipers. The operator can also actuate the windshield wash function by pressing the entire control knob axially inwardly.

Moving the entire control knob axially is somewhat undesirable, since the inwardly moved control knob may cover graphics on the switch stalk. Further, the axial movement of the control knob sometimes exposes grease from inside the switch stalk. Moreover, the currently-used switch stalk is difficult to assemble because the components of the switch stalk with an axially movable control knob cannot be assembled sequentially from the inner end to the outer end of the switch stalk.

Many current vehicles include a rear wiper for the rear window. The rear wiper and rear wash controls are usually located on the instrument panel. It would be desirable to have the rear controls associated with the front controls. Further, it is desirable to reduce the number of controls on the instrument panel to provide a more attractive appearance and to make controls easier to locate and operate.

SUMMARY OF THE INVENTION

The present invention provides a sturdy, easily-assembled multifunctional switch stalk which includes controls for both the front and rear wash and wiper functions. The front wiper functions are preferably controlled by a rotatable front control knob. In one feature, an axially compressible wash push button on the outer end of the control knob actuates the front windshield wash function. The axially compressible wash push button permits the front control knob to remain axially fixed. The front control knob does not cover the function graphics on the switch stalk and does not expose grease from within the switch stalk. Moreover, this arrangement facilitates the assembly of the switch.

The wash push button includes an extended wash push leg slidable through a passage in the control knob and abutting a wash leg of a metal contactor. Upon axial compression of the wash push button the extended wash push leg bends the wash leg of the metal contactor causing the wash leg to make conductive contact with an electrical contact on a printed circuit board. This actuates the wash function.

In another feature, a second control ring is incorporated into the switch. In one embodiment, the rear wiper and wash functions are controlled by a rear control ring. The rear control ring actuates a rear window wash in extreme rotational positions. A spring return biases the rear control ring back from the rear wash position upon release of the control ring by the operator.

To achieve the spring bias, a function ring is non-rotatably mounted between the control ring and the control knob. The function ring includes two sets of detents, each including two ramps. Each set of detents engages a detent finger biased from the control ring. At each rotational extreme, the detent fingers ride up ramps thereby compressing the detent spring. The compressed detent springs bias the detent fingers back down the ramps thereby returning the control ring from the extreme position upon release of the control ring by the operator.

The addition of the rear wiper/wash control ring to the switch stalk eliminates a set of controls from the instrument panel and locates the rear wipe/wash controls conveniently near the front wipe/wash controls. The control ring actuates the rear wash function in two extreme rotational positions. Therefore the wash function can be conveniently actuated from either a wipe position or the off position, with the spring return returning the control ring upon release of the control ring by the operator.

In a method of assembly according to the present invention, the multifunction switch stalk components are mounted sequentially on the shaft outwardly to the front control knob and retained by a snap ring on the end of the shaft. Since all of the components can be simply slid onto the shaft, assembly is quite simple. In addition, once all the components are mounted on the shaft, play between adjacent parts is reduced and there is no build up of tolerances. A wash push button is then snap fit onto the outer end of the control knob, concealing the shaft and the snap ring.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
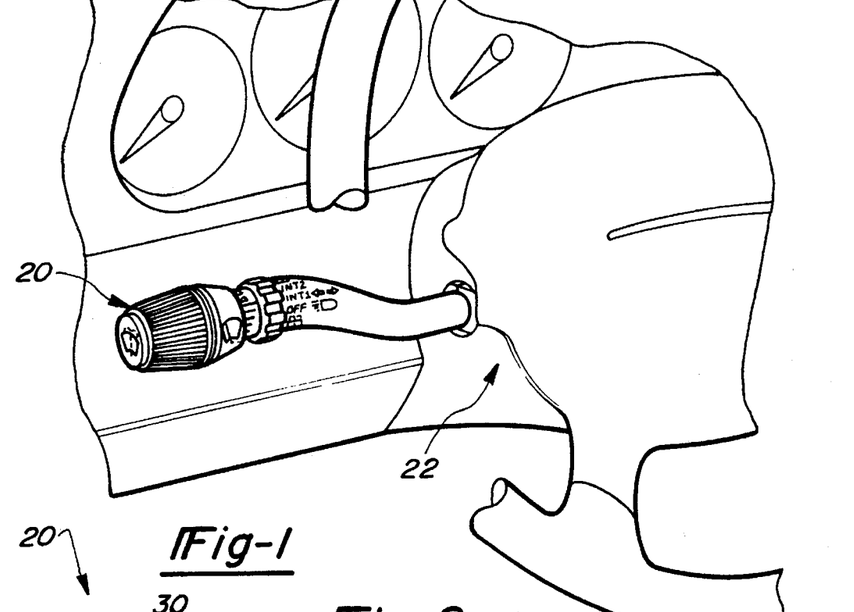
FIG. 1 is a perspective view of a multifunction switch stalk in accordance with the present invention mounted on a vehicle steering column.

A multifunction switch stalk 20 according to the present invention is shown in FIG. 1 mounted on a vehicle steering column 22. In one embodiment, the present invention includes controls for the front windshield wipers, a front windshield wash, the rear wipers, and a rear wash. Accordingly various components are designated "front" or "rear." However it should be apparent that the multifunction switch stalk 20 could be used to control other vehicle functions.

Figures 2, 3:
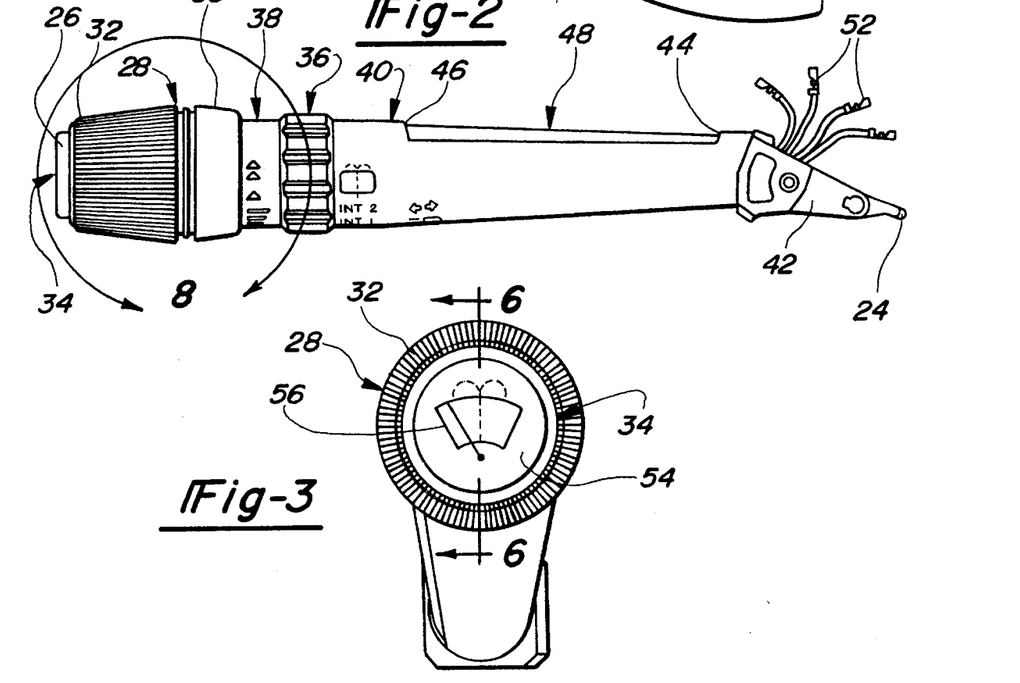
FIG. 2 is a top view of a multifunction switch stalk in accordance with the present invention.
FIG. 3 is an end view of the multifunction switch stalk of FIG. 2.

As can be seen in FIG. 2, the multifunction switch stalk 20 has an inner end 24 and an outer end 26. A generally cylindrical control knob 28 has an inner end 30 and a tapered outer end 32 and is rotatable on the outer end 26 of the multifunction switch stalk 20 to selectively actuate vehicle functions, such as the front windshield wipers. The outer end 32 of the control knob 28 includes a wash push button 34 which is axially compressible relative to the control knob 28 to selectively actuate a vehicle function, such as a front windshield wash. The multifunction switch stalk 20 further includes a control ring 36 rotatable to selectively actuate predetermined vehicle functions, such as the rear wipers and a rear window wash. The control ring 36 actuates a rear window wash in extreme rotational positions and is provided with a spring return from each wash position. A generally cylindrical function ring 38 is non-rotatably mounted between the control ring 36 and the control knob 28. A plastic handle 40 includes a wedge-shaped base portion 42. The handle 40 further includes an inner cavity 44 accessible by a rear orifice 46 over which a cover 48 is secured. The inner cavity 44 is also accessible by an axial opening (not shown) in the base portion 42 through which wires 52 are routed.

As can be seen in FIG. 3, the wash push button 34 has a closed outer end 54 received within the control knob 28. As shown, a graphic 56 indicates that the wash push button 34 actuates a windshield wash function.

Figure 4:
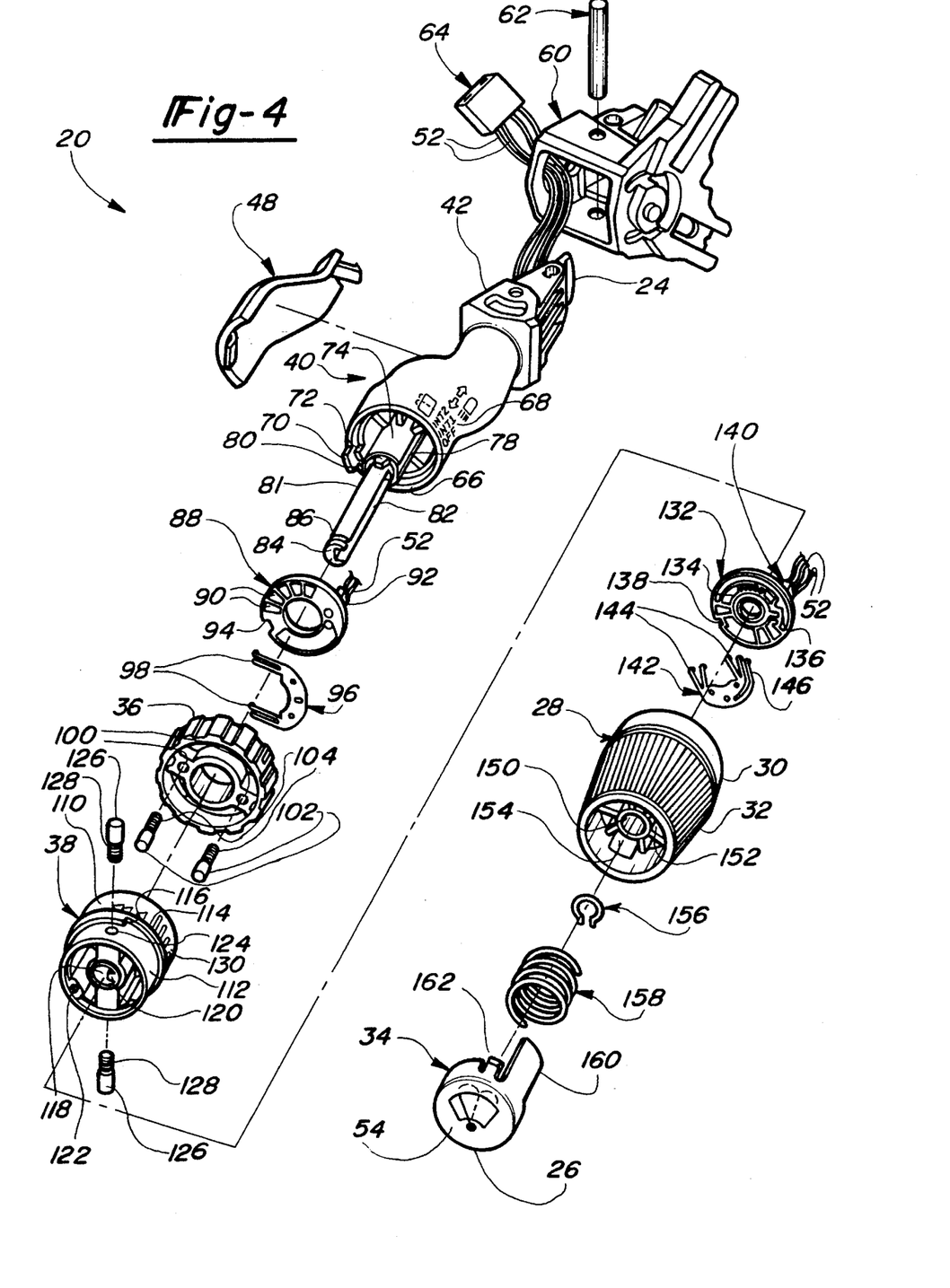
FIG. 4 is an exploded, perspective view of the multifunction switch stalk of FIG. 2 with structure for mounting in a vehicle steering column.

Referring to FIG. 4, the base portion 42 of the handle 40 is mounted in an actuator 60 with a pivot pin 62. Wires 52 are connected to a wire harness 64. At an outer end 66 of the handle 40, rear function graphics 68 indicate various functions of the control ring 36 such as rear wipers and rear window wash. The outer end 66 of the handle 40 further includes an extended axial tab 70. A key 72 is disposed on the inner circumference of the outer end 66.

The outer end 66 further includes a first shaft portion 74 which is integral with the handle 40. The first shaft portion 74 has a flattened portion 78 and a pair of tapered teeth 80 (one shown) extend from the first shaft portion 74. A second shaft portion 81, preferably formed of a metal or a powdered metal, has a diameter less than the diameter of the first shaft portion 74 and is preferably insert-molded with the handle 40 in the first shaft portion 74. The second shaft portion 81 has an axial channel 82 extending from the first shaft portion 74 to an outer end 84 of the second shaft portion 81. The outer end 84 of the second shaft portion 81 includes a circumferential notch 86 for retaining a snap ring.

An annular rear printed circuit board 88 includes a plurality of electrical contacts 90 connected to a rear harness assembly 92 which is connected to wires 52. The outer circumference of the rear printed circuit board 88 includes a notch 94 to be received on the key 72 to position the rear printed circuit board 88 on the outer end 66 of the handle 40. A rear metal contactor 96 includes a plurality of contact legs 98 for connecting selected electrical contacts 90 on the rear printed circuit board 88.

The control ring 36 includes a pair of axial bores 100 each containing a detent finger 102 biased by a detent spring 104 toward the function ring 38.

The function ring 38 has a larger diameter portion 110 and a reduced diameter portion 112 separated by an axial abutment ring 114. The reduced diameter portion 112 further includes a semi-circular abutment ring 116 adjacent the axial abutment ring 114. A cylindrical aperture 118 extends axially through the center of the function ring 38 and includes a key 120 to be received within the axial channel 82 in the second shaft portion 81. The reduced diameter portion 112 includes a key 122 at its inner circumference. A pair of radial bores 124 (one shown) each contain a detent finger 126 biased radially outwardly by a detent spring 128. Front function graphics 130 indicating various functions of the control knob 28 are disposed on the larger diameter portion 110.

A front printed circuit board 132 includes a plurality of electrical contacts 134 to control wiper speed. A semi-circular wash electrical contact 136 is disposed on the outer periphery of the front printed circuit board 132. The front printed circuit board 132 further includes a notch 138 to be received on the key 122 at the inner circumference of the reduced diameter portion 112 of the function ring 38. A harness assembly 140 disposed on the front printed circuit board 132 connects the wires 52 to the electrical contacts 134 and 136. A front metal contactor 142 has a plurality of contact legs 144 including a wash leg 146 for making conductive contact with the electrical contacts 134 and 136 on the front printed circuit board 132.

The control knob 28 includes an inner cylinder 150 and an axial passage 152 between the inner cylinder 150 and the control knob 28. A pair of recesses 154 for engaging snap fit tabs are disposed on the inside of the control knob 28 at the outer end 32. A snap ring 156 is receivable within the circumferential notch 86 on the outer end 84 of the second shaft portion 81 for securing the components in the multifunction switch stalk 20.

A push button return spring 158 is disposed between the control knob 28 and the wash push button 34 to return the wash push button 34 upon release by an operator. A wash push leg 160 extends from the wash push button 34 opposite the closed outer end 54 and is slidable in the axial passage 152 in the control knob 28. The wash push button 34 further includes a pair of snap fit tabs 162 to be received within the recesses 154 inside the control knob 28.

Figure 5:
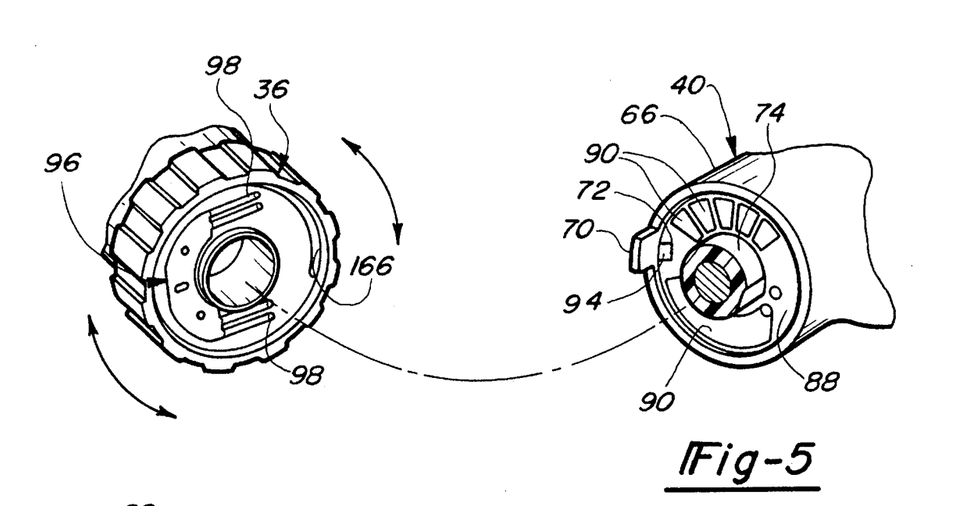
FIG. 5 is a partially exploded, perspective view of the control ring and handle of the multifunction switch stalk of FIG. 2.

As shown in FIG. 5 the rear printed circuit board 88 is mounted on the first shaft portion 74 of the handle 40 with the notch 94 engaging the key 72 to align the rear printed circuit board 88. The control ring 36 includes a slot 166 partially around the inner periphery of the control knob 36 and receivable of the extended axial tab 70 on the outer end 66 of the handle 40. The rear metal contactor 96 is mounted on the control ring 36. The control ring 36 is rotatably mounted on the first shaft portion 74 with the extended axial tab 70 slidably inserted in the slot 166 to limit the rotational range of movement of the control ring 36. The control ring 36 is rotatable on the first shaft portion 74 so that the contact legs 98 of the rear metal contactor 96 make conductive contact with the electrical contacts 90 on the rear printed circuit board 88 thereby actuating a predetermined set of vehicle functions upon rotation of the control ring 36. Preferably the control ring 36 and electrical contacts 90 actuate a rear window wash in a first rotational position, a rapid rear window wipe in a second rotational position adjacent the first rotational position, a slow rear window wipe in a third rotational position adjacent the second rotational position, off in a fourth rotational position adjacent the third rotational position, and a rear window wash in a fifth rotational position adjacent the fourth rotational position.

Figure 6:
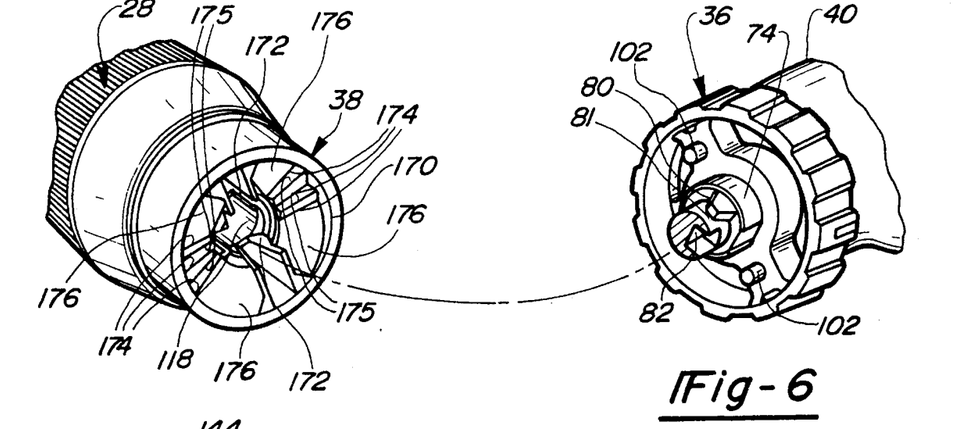
FIG. 6 is a partially exploded, perspective view of the function ring and control ring of the multifunction switch stalk of FIG. 3 taken along line 6—6.

As can be seen in FIG. 6, an inner end 170 of the function ring 38 includes a pair of grooves 172 adjacent the cylindrical aperture 118 which receive the teeth 80 on the first shaft portion 74. The inner end 170 further includes two sets of detents 174 for engaging the detent fingers 102 in the control ring 36 at three distinct positions. Each set of detents 174 for engaging the detent fingers 102 includes high points 175 separating detents 174. A pair of ramps 176 are positioned circumferentially outwardly of each outermost detent 174. High points 175 and ramps 176 each extend towards the control ring 36 from the function ring 38. The function ring 38 is mounted on the second shaft portion 81 with the key 120 (not shown in this Figure) in the axial cylindrical aperture 118 engaging the axial channel 82 in the second shaft portion 81. Further the tapered teeth 80 on the first shaft portion 74 engage the grooves 172 on the inner end 170 of the function ring 38, preventing rotation of the function ring 38 relative to the handle 40.

Referring to FIG. 6, the detent fingers 102 in the rear wiper control ring 82 engage in the detents 174 on the function ring 38 to define three fixed positions, thereby providing tactile feedback to the operator and insuring alignment of the contact legs 98 of the rear metal contactor 96 with the electrical contacts 90 on the rear printed circuit board 88. The ramps 176 in the function ring 38 provide a spring return from a first rotational position (rear window wash) to the second rotational position (rapid rear wipers) and from the fifth rotational position (rear window wash) to the fourth rotational position (off). The control ring is received at the second, third and fourth positions with the detents finger received in respective detents 174. When the control ring 36 is rotated from the second rotational position (rapid rear wipers) to the first position (rear window wash), the detent fingers 102 each ride up a ramp 176 thereby compressing a detent spring 104. The compressed detent spring 104 returns the control ring 36 from the first position to the second position upon release of the control ring 36 by the operator. Similarly, when the control ring 36 is rotated from a fourth position (off) to a fifth position (rear window wash) the detent fingers 102 ride up another pair of ramps 176 compressing detent springs 104. The detent springs 104 bias the detent fingers 102 down the ramps 176 thereby returning the control ring 36 to the fourth position (off) upon the release of the control ring 36 by the operator. The operator can therefore conveniently actuate the wash function when the rear wipers are on by rotating the control ring in a first direction to one rotational extreme, or when the rear wipers are off, by rotating the control ring in an opposite second direction to the other rotational extreme.

Figure 7:
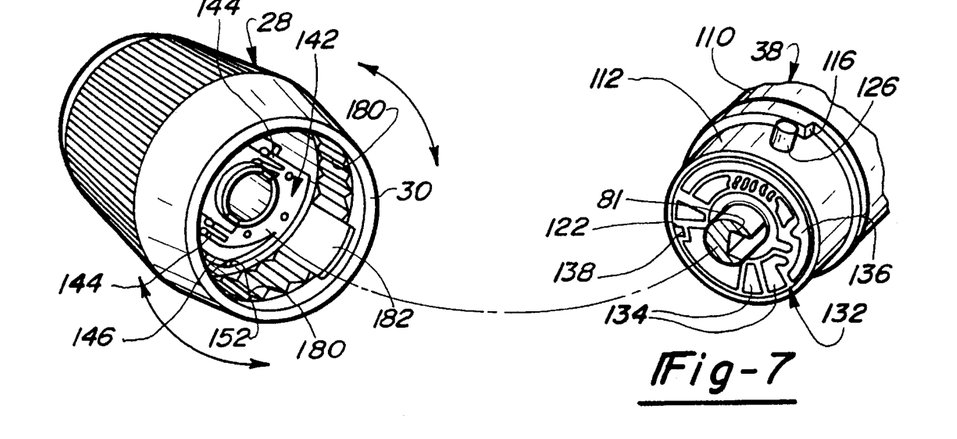
FIG. 7 is a partially exploded, perspective view of the control knob and function ring of the multifunction switch stalk of FIG. 2.

Referring to FIG. 7 the front printed circuit board 132 is mounted on the second shaft portion 81 and in the reduced diameter portion 112 of the function ring 38 with the notch 138 engaging the key 122 on the inner circumference of the reduced diameter portion 112. The inner circumference of the inner end 30 of the control knob 28 includes a plurality of detents 180 for engaging the detent fingers 126 in the function ring 38 and an axial stop 182. The front metal contactor 142 is mounted within the inner end 30 of the control knob 28 such that the wash leg 146 of the front metal contactor 142 is adjacent the axial passage 152 through the control knob 28. The control knob 28 is rotatably mounted on the second shaft portion 81 and the reduced diameter portion 112 of the function ring 38 such that the detent fingers 126 of the function ring 38 engage the detents 180 in the inner end 30 of the control knob 28 and the contact legs 144, not including the wash leg 146, make conductive contact with the wiper speed electrical contacts 134 on the front printed circuit board 132 upon rotation of the control knob 28. The axial stop 182 limits the rotational movement of the control knob 28 by abutting the semi-circular abutment ring 116 on the function ring 38.

Figure 8:
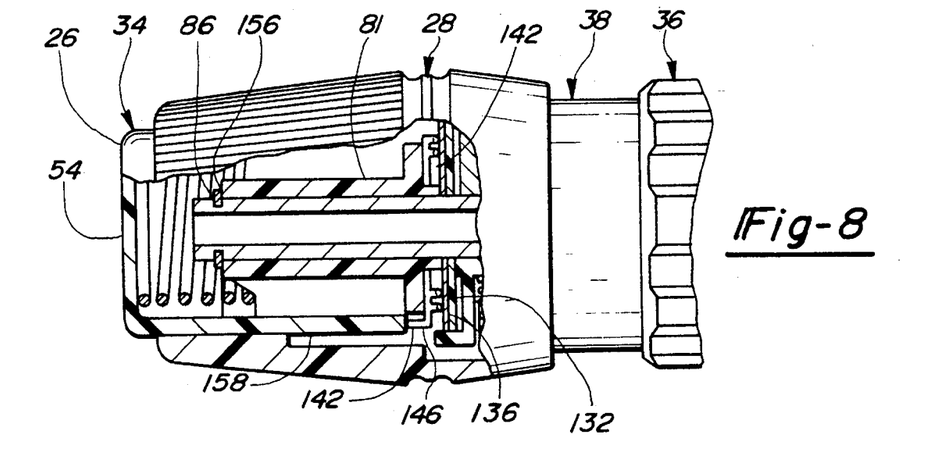
FIG. 8 is an enlarged view, partially broken away, of the outer end of the multifunction switch stalk of FIG. 2 designated by line 8.
Figure 9:
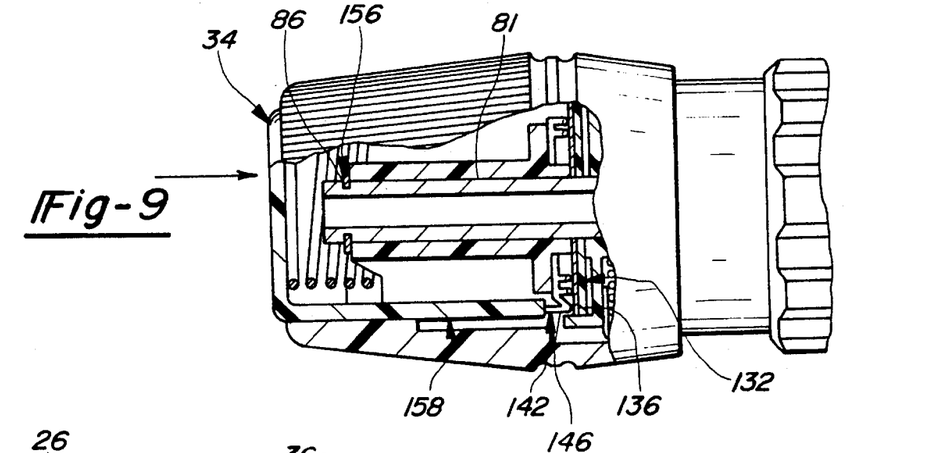
FIG. 9 shows the multifunction switch stalk of FIG. 8 with the wash push button axially compressed.

As can be seen in FIG. 8, normally the wash leg 146 of the front metal contactor 142 does not make conductive contact with the wash electrical contact 136 on the front printed circuit board 132. However, upon axial compression of the wash push button 34 as shown in FIG. 9, the wash push leg 158 elastically deforms the wash leg 146 of the front metal contactor 142 causing the wash leg 146 to make conductive contact with the wash electrical contact 136 on the front printed circuit board 132. Referring to FIG. 7, it should be apparent that the front windshield wash function is independent of the rotational position of the control knob 28 since the wash electrical contact 136 is curved and is disposed over approximately half of the periphery of the front printed circuit board 132.

Figure 10:
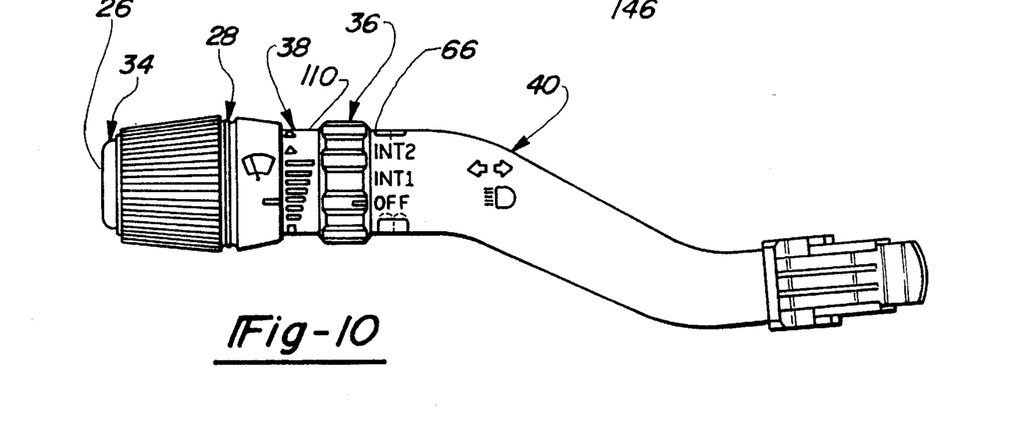
FIG. 10 is a front view of the multifunction switch stalk of FIG. 2.
Figure 11:
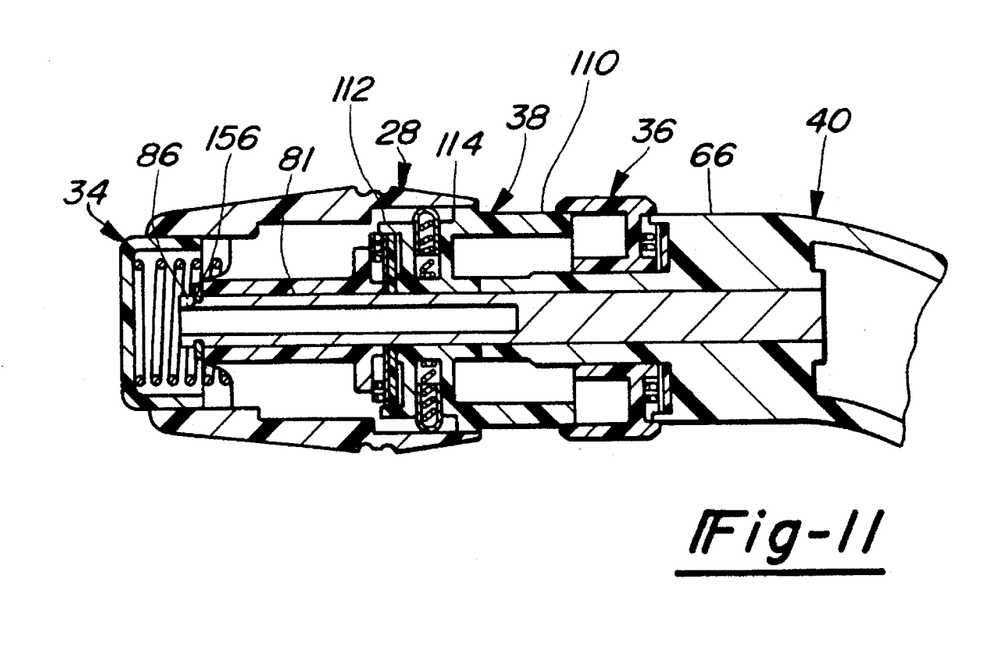
FIG. 11 is a cross-sectional view of the multifunction switch stalk of FIG. 10.

Since the wash push button 34, is axially compressible independently of the control knob 28, the components may be mounted sequentially on the first shaft portion 74 and second shaft portion 81 from the handle 40 to the outer end 26 as described above and retained with the snap ring 156 or other fastener. As can be seen in FIGS. 10 and 11, the outer end 66 of the handle 40 extends slightly within the control ring 36, as does the larger diameter portion 110 of the function ring 38. The reduced diameter portion 112 and the axial abutment ring 114 of the function ring 38 are entirely within the control knob 28. The function ring 38 is non-rotatable relative to the handle 40. The described method of assembling the multifunction switch stalk 20 reduces play between parts and prevents the buildup of tolerances which would otherwise occur.

By using the control ring 36 to control the rear wipers and wash functions, a set of controls which would otherwise be on the instrument panel can be eliminated. Further, the controls for rear wipers and rear wash are conveniently located near the controls for the front wipers and front wash.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A multifunction switch stalk comprising:

a handle having an inner end and an outer end, said handle including a base portion at said inner end for being mounted on a vehicle steering column;

a control knob disposed on said outer end of said handle, said control knob being rotatable to selectively actuate predetermined vehicle functions;

a push button disposed on an outer end of said control knob, said button being axially compressible relative to said control knob to selectively actuate a predetermined vehicle function;

a contactor having a plurality of legs including a first leg, said contactor mounted on an inner axial end of said control knob and rotatable with said control knob;

a plurality of electrical contacts including a first electrical contact, said plurality of contacts disposed adjacent said contactor, at least one of said legs of said contactor making conductive contact with at least one of said electrical contacts upon rotation of said control knob to actuate predetermined vehicle functions; and said first leg making conductive contact with said first electrical contact upon axial movement of said push button thereby actuating a predetermined vehicle function.

2. A multifunction switch stalk comprising:

a handle having an inner end and an outer end, said handle including a base portion at said inner end for being mounted on a vehicle steering column;

a control knob disposed on said handle, said control knob being rotatable to selectively actuate predetermined vehicle functions;

a push button disposed on an outer end of said control knob, said button being axially compressible relative to said control knob to selectively actuate a predetermined vehicle function; and a shaft having an axis and an outer end, said shaft extending from said outer end of said handle, said shaft includes a circumferential notch adjacent said outer end, a snap ring snap-fit into said circumferential notch retaining said control knob on said shaft.

3. The multifunction switch stalk according to claim 2 wherein said push button snaps into said control knob, concealing said snap ring.

4. The multifunction switch stalk according to claim 1 wherein said first leg is metal and said control knob further includes an axially-extending passage, said push button further including a push leg slidably disposed within said passage in said control knob, said first metal leg abutting said push leg of said push button and being elastically deformed upon axial movement of said push button, said first metal leg making conductive contact with said first electrical contact upon axial movement of said push button thereby actuating a predetermined vehicle function.

5. The multifunction switch stalk according to claim 1 wherein said first electrical contact is curved such that said first metal leg of said metal contactor makes conductive contact with said first electrical contact independently of the rotational position of said control knob.

6. The multifunction switch stalk according to claim 1 wherein said control knob actuates a windshield wiper and said push button actuates a windshield wash function.

7. A multifunction switch stalk comprising:

a handle having an inner end and an outer end, said handle including a base portion at said inner end for being mounted on a vehicle steering column;

a shaft having an axis and an outer end, said shaft extending from said outer end of said handle;

a control knob disposed on an outer end of said shaft, said control knob being rotatable relative to said shaft to selectively actuate a first set of predetermined vehicle functions;

a control ring disposed on said shaft, said control ring being rotatable relative to said shaft to selectively actuate a second set of predetermined vehicle functions, said control ring including at least three rotational positions, said control ring further including a spring return for returning said control ring from a first rotational position to a second rotational position upon release of the control ring by an operator.

8. A multifunction switch stalk comprising:

a handle having an inner end and an outer end, said handle including a base portion at said inner end for being mounted on a vehicle steering column;

a shaft having an axis and an outer end, said shaft extending from said outer end of said handle;

a control knob disposed on an outer end of said shaft, said control knob being rotatable to selectively actuate a first set of predetermined vehicle functions;

a control ring disposed on said shaft, said control ring being rotatable to selectively actuate a second set of predetermined vehicle functions; and a generally cylindrical function ring non-rotatably mounted on said shaft between said control knob and said control ring, said shaft including a first shaft portion and a second shaft portion, said first shaft portion of said shaft extending from said outer end of said handle, said second shaft portion of said shaft extending from said first shaft portion, said first shaft portion having a diameter greater than the diameter of said second shaft portion, said control ring being rotatably mounted on said first shaft portion, said function ring being non-rotatably mounted on said shaft adjacent said control ring, said control knob being rotatably mounted on said second shaft portion.

9. The multifunction switch stalk according to claim 8 wherein said first shaft portion of said shaft is integral with said handle, said second shaft portion of said shaft being metal, said second shaft portion being insert-molded with said first shaft portion.

10. A multifunction switch stalk comprising:

a handle having an inner end and an outer end, said handle including a base portion at said inner end for being mounted on a vehicle steering column;

a shaft having an axis and an outer end, said shaft extending from said outer end of said handle;

a control knob disposed on an outer end of said shaft, said control knob being rotatable to selectively actuate a first set of predetermined vehicle functions;

a control ring disposed on said shaft, said control ring being rotatable to selectively actuate a second set of predetermined vehicle functions; and said shaft including a circumferential notch adjacent said outer end, said control knob being retained on said shaft by a snap ring snap-fit into said circumferential notch.

11. A multifunction switch stalk comprising:

a handle having an inner end and an outer end, said handle including a base portion at said inner end for being mounted to a vehicle steering column;

a shaft having an axis and an outer end, said shaft extending from said outer end of said handle;

a control ring rotatably disposed on said shaft, said control ring being rotatable to selectively actuate predetermined vehicle functions, said control ring including at least four rotational positions;

a spring return for returning said control ring from a first extreme rotational position to a second rotational position upon release of the control ring by an operator, said shaft including a circumferential notch adjacent said outer end, said control ring being retained on said shaft by a snap ring disposed in said circumferential notch.

12. A multifunction switch stalk comprising:

a handle having an inner end and an outer end, said handle including a base portion at said inner end for being mounted to a vehicle steering column;

a shaft having an axis and an outer end, said shaft extending from said outer end of said handle;

a control ring rotatably disposed on said shaft, said control ring being rotatable to selectively actuate predetermined vehicle functions, said control ring including at least three rotational positions;

a spring return for returning said control ring from a first extreme rotational position to a second rotational position upon release of the control ring by an operator, said spring return includes a ramp and a detent finger biased by a detent spring, said detent finger riding up said ramp upon rotation of said control ring by an operator to a first extreme rotational position thereby compressing said detent spring, said compressed detent spring biasing said detent finger down said ramp thereby returning said control ring from said first extreme rotational position to said second rotational position upon the release of said control ring by said operator.

13. The multifunction switch stalk according to claim 12 wherein said control ring also being returned from a fourth rotational position to a third rotational position, with a detent finger riding up a second ramp compressing a detent spring upon rotation of the control ring in a second direction towards said fourth rotational position, said fourth rotational position being a second extreme rotational position, said compressed detent spring biasing said detent finger down said second ramp thereby returning said control ring from said fourth position to said third position upon the release of said control ring by said operator.

14. The multifunction switch stalk according to claim 13 wherein a single detent finger rides up both said first and second ramps.

15. The multifunction switch stalk according to claim 12 wherein said first extreme rotational position and said second extreme rotational position actuate the same predetermined vehicle function.

16. The multifunction switch stalk according to claim 11 further including a spring return for returning said control ring from a fourth rotational position to a third rotational position upon release of the control ring by an operator.

17. The multifunction switch stalk according to claim 16 wherein a single spring return returns said control ring from said first extreme rotational position to said second rotational position and from said fourth rotational position to said third rotational position.

* * * * *